(12) United States Patent
Hirsch et al.

(10) Patent No.: US 12,316,252 B2
(45) Date of Patent: May 27, 2025

(54) ELECTRICAL SYSTEM AND METHOD AND APPARATUS FOR DETERMINING A VALUE PROFILE OF A CONTROLLED VARIABLE

(71) Applicant: Robert Bosch GmbH, Stuttgart (DE)

(72) Inventors: Michele Hirsch, Esslingen (DE);
Christian Hahn, Nuremberg (DE);
Markus Becker, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 174 days.

(21) Appl. No.: 18/256,076

(22) PCT Filed: Nov. 5, 2021

(86) PCT No.: PCT/EP2021/080743
§ 371 (c)(1),
(2) Date: Jun. 6, 2023

(87) PCT Pub. No.: WO2022/122262
PCT Pub. Date: Jun. 16, 2022

(65) Prior Publication Data
US 2024/0022193 A1 Jan. 18, 2024

(30) Foreign Application Priority Data
Dec. 8, 2020 (DE) ...................... 10 2020 215 464.3

(51) Int. Cl.
*H02P 27/04* (2016.01)
*H02P 23/00* (2016.01)
(Continued)

(52) U.S. Cl.
CPC .......... *H02P 23/0022* (2013.01); *H02P 27/06* (2013.01); *H02P 29/032* (2016.02); *H02P 29/60* (2016.02); *B60L 3/0061* (2013.01)

(58) Field of Classification Search
CPC .... H02P 23/0022; H02P 27/06; H02P 29/032; H02P 29/60; B60L 3/0061
See application file for complete search history.

(56) References Cited

U.S. PATENT DOCUMENTS

| 10,151,301 B2 | 12/2018 | Caponetti et al. |
| 2011/0127956 A1* | 6/2011 | Mitsutani .............. B60W 10/26 320/109 |

(Continued)

FOREIGN PATENT DOCUMENTS

| DE | 102016220536 A1 | 4/2018 |
| WO | 2019219214 A1 | 11/2019 |

OTHER PUBLICATIONS

Translation of International Search Report for Application No. PCT/EP2021/080743 dated Feb. 25, 2022 (2 pages).

(Continued)

*Primary Examiner* — Muhammad S Islam
(74) *Attorney, Agent, or Firm* — Michael Best & Friedrich LLP (57) ABSTRACT

The invention relates to a method for determining a value profile of a controlled variable of an electrical system. Differences between predetermined values of an output variable at an end time and a determined value of the output variable at the end time are determined. A value profile of the controlled variable in the time interval is predetermined, the value profile being dependent on an end value at the end time and is being determined uniquely by the specification of the end value. Allowed values of the controlled variable are determined such that, when the electrical system is activated, the value of the output variable at the end time is equal to the determined difference. A curve of the allowed values of the controlled variable is determined on the basis of the allowed values of the controlled variable. A point of intersection of the determined curve and a predetermined (Continued)

derating function is determined. The value profile of the controlled variable within the time interval is determined as the value profile for which the end value of the value profile assumes the value of the controlled variable at the point of intersection.

10 Claims, 10 Drawing Sheets

(51) Int. Cl.
    *H02P 27/06* (2006.01)
    *H02P 29/032* (2016.01)
    *H02P 29/60* (2016.01)
    *B60L 3/00* (2019.01)

(56) References Cited

U.S. PATENT DOCUMENTS

2014/0021898 A1* 1/2014 Hendrickson ......... H02P 29/028
                                                          318/434
2019/0041833 A1* 2/2019 Walther ............... G05B 19/418

OTHER PUBLICATIONS

Wallscheid et al., "Derating of Automotive Drive Systems Using Model Predictive Control," IEEE International Symposium on Predictive Control of Electrical Drives and Power Electronics, 2017, 6 pages.

* cited by examiner

ELECTRICAL SYSTEM AND METHOD AND APPARATUS FOR DETERMINING A VALUE PROFILE OF A CONTROLLED VARIABLE

BACKGROUND

The present invention relates to a method for determining a value profile of a controlled variable of an electrical system as well as a corresponding apparatus. The invention further relates to an electrical system. The electrical system can in particular be an electrical drive or can comprise an electrical drive.

Given that losses occur during the operation of an electrical system, e.g. an electrical drive, components of the electrical system, e.g. power modules of an inverter, or a rotor or stator of a machine, heat up. In order to avoid overheating and the resulting damage to temperature-sensitive components, the ensuing temperatures are monitored by means of sensors and models.

Derating or curtailment procedures are implemented and performed as self-protection measures. In the present context, this means that the operating state of the components of the electrical system is modified or curtailed in order to avoid exceeding critical temperatures.

In order to choose an appropriate operating strategy of the electrical drive, it is advantageous for the control unit (VCU) (e.g., in the vehicle) to obtain information from an electrical drive controller regarding how much power can be requested from the electrical drive at a future time interval, e.g., in the next 1, 5, or 10 seconds so that the protective measures are not activated just yet. In contrast to range prediction or model predictive control, this relates to a prediction of the performance of the electrical drive.

Various forward modeling strategies exist for this purpose. It can then be calculated whether a derating is to be expected on the basis of the current operating state for the future time interval. However, the parent control unit only receives the information regarding whether or not the current operating state can be maintained. A potentially required adjustment of the operating state cannot be derived.

Further, starting from the current thermal state and assuming a maximum load during the future time interval, it can be calculated which temperatures would be achieved at this load. The associated, restricted load state is determined from a predetermined derating characteristic curve. However, the iterative nature of the derating, i.e., the feedback of the instantaneous temperature to the instantaneous allowed load, is not considered in this case. The prediction is therefore usually too conservative.

This forward modeling can be iteratively repeated using various load cases until a limit temperature is met, but doing so is laborious. If the derating method engages, then the load case can be iterated consistently using the derating conditions, but this is also very complex.

A model predictive approach is known from Wallscheid et al., "Derating of Automotive Drive Systems Using Model Predictive Control," 4th Symposium on Predictive Control of Electrical Drives and Power Electronics, 2017. One prerequisite is that driving strategy and derating be controlled together, which is often not the case because the electrical drive is not responsible for the operating or driving strategy, and the parent VCU, in turn, is not responsible for the self-protection.

Finally, artificial intelligence can be employed, but this requires laborious data generation and acquisition, because the predicted loads are only applied to a driving strategy as additional information, and they are often not specifically initiated. Complex special profiles would therefore need to be run for the training data.

SUMMARY

The invention provides a method and apparatus for determining a value profile of a controlled variable of an electrical system, as well as an electrical system.

According to a first aspect, the invention therefore relates to a method for determining a value profile of a controlled variable of an electrical system at a predetermined time interval. The electrical system is activated using the controlled variable. On the basis of the system behavior of the electrical system, an output variable is set in the electrical system dependent on the controlled variable. Dependent on an actual value of the output variable at a starting time of the time interval and dependent on the controlled variable assuming the value zero within the time interval, a value of the output variable is determined at an end time of the predetermined time interval. A first difference between a first predetermined value of the output variable at the end time and the determined value of the output variable at the end time is determined. Further, at least one second difference between at least one of a second predetermined value of the output variable at the end time and the determined value of the output variable at the end time is determined. A value profile of the controlled variable in the time interval is predetermined, the value profile being dependent on an end value at the end time and is being determined uniquely by the specification of the end value. A first allowed value of the controlled variable is determined such that, when activating the electrical system, the value of the output variable at the end time is equal to the determined first difference, dependent on the controlled variable assuming the predetermined value profile within the time interval, whereby the end value is equal to the first allowed value. At least one second allowed value of the controlled variable is determined such that, when activating the electrical system, the value of the output variable at the end time is equal to the determined second difference, dependent on the controlled variable assuming the predetermined value profile within the time interval, whereby the end value is equal to the second allowed value. On the basis of the at first allowed value of the controlled variable for the first predetermined value of the output variable and on the basis of the at least one second allowed value of the controlled variable for the at least one second predetermined value of the output variable, a curve of the allowed values of the controlled variable is determined on the basis of the output variable. A point of intersection of the determined curve and a predetermined derating function is determined, whereby the derating function describes a maximum allowed controlled variable in a derating method dependent on the output variable. The value profile of the controlled variable within the time interval is determined as the value profile for which the end value of the value profile assumes the value of the controlled variable at the point of intersection.

According to a second aspect, the invention relates to an apparatus for determining a value profile of a controlled variable of an electrical system at a predetermined time interval, whereby the electrical system can be activated with the controlled variable, and whereby, on the basis of a system behavior of the electrical system dependent on the controlled variable, an output variable is set in the electrical system. The apparatus comprises a computing device that determines a value of the output variable at an end time of the predetermined time interval can be determined dependent on an actual value of the output variable at a starting time of the time interval, dependent on the controlled variable assuming the value zero within the time interval. The computing device further determines a first difference between a first predetermined value of the output variable at the end time and the determined value of the output variable at the end time. Further, the computing device determines at least one second difference between at least one of a second predetermined value of the output variable at the end time and the determined value of the output variable at the end time. The computing device determines a value profile of the controlled variable in the time interval, the value profile being dependent on an end value at the end time and being determined uniquely by the specification of the end value. The computing device determines a first allowed value of the controlled variable such that, when the electrical system is activated, the value of the output variable at the end time is equal to the determined first difference, dependent on the controlled variable assuming the predetermined value profile within the time interval, the end value being equal to the first allowed value. The computing device determines at least one second allowed value of the controlled variable such that, when the electrical system is activated, the value of the output variable at the end time is equal to the determined second difference, dependent on the controlled variable assuming the predetermined value profile within the time interval, the end value being equal to the second allowed value. The computing device determines a curve of the allowed values of the controlled variable on the basis of the output variable, on the basis of the first allowed value of the controlled variable for the first predetermined value of the output variable, and on the basis of the at least one second allowed value of the controlled variable for the at least one second predetermined value of the output variable. The computing device determines a point of intersection of the determined curve and a predetermined derating function. The derating function describes a maximum permitted controlled variable in a derating method dependent on the output variable. The computing means determines the value profile of the controlled variable within the time interval as the value profile for which the end value of the value profile assumes the value of the controlled variable at the point of intersection. The apparatus further comprises an interface designed to output the determined value profile of the controlled variable for controlling the electrical system.

According to a third aspect, the invention relates to an electrical system having an apparatus according to the invention for determining a value profile of a controlled variable of the electrical system. The electrical system further comprises a control means designed to control the electrical system within the time interval dependent on the determined value profile of the controlled variable.

According to the invention, a value profile of a controlled variable is predicated, which profile can be used for the predetermined time interval in order to control the electrical system. The starting time of the time interval in this case corresponds to the current time or a starting point of the activation process. The value profile of the controlled variable is calculated such that a derating method is prevented from being used, or a limitation is performed on the basis of the active engagement of the derating.

The method determines the maximum possible load case that the electrical system can provide in the time interval without conflicting with a derating. The method enables the correct consideration of any derating curves by a suitable and efficient reverse modeling of the load state that is still possible. The value profile of the controlled variable should therefore also be able to be used for controlling as determined in consideration of the derating behavior during the entire time interval. Any unforeseen change in the controlled variables on the basis of the derating behavior is thereby avoided.

By determining the value of the output variable at the end time, whereby the controlled variable assumes the value zero within the time interval, a decaying operation is described in the unloaded case, i.e., assuming that no further load is applied during the time interval.

The determination of the first difference or second difference corresponds to a respective reserve, for example a temperature reserve, which exists in comparison to the unloaded case and thus remains within the time interval for the application of a load.

The predetermined value profile of the controlled variable can be a constant jump. In this case, the value of the controlled variable is set to a fixed value at the starting time and remains at the set value during the time interval. A load jump can be described by means of a Heaviside function using a scalable prefactor. The calculation can as a result be completed easily and quickly.

The predetermined value profile of the controlled variable can also follow a predetermined function. For example, the value of the controlled variable can increase linearly or squarely. The value profile is thus linear or parabolic.

According to one embodiment of the method, the value profile can also depend on the starting value of the controlled variable at the starting time of the time interval. Accordingly, the determined value profile of the controlled variable within the time interval can also depend on a starting value of the controlled variable at the starting time of the time interval.

According to one embodiment of the method, the determined value profile of the controlled variable is made available to a parent system as input information for the operating or driving strategy. In particular, the invention relates to a method for activating the electrical system, the determined value profile of the controlled variable being used for activating the electrical system.

According to one embodiment of the method, the electrical system is activated such that the controlled variable follows the determined value profile within the time interval. However, it can also be provided to control the controlled variable such that it is less than or equal to the corresponding value of the determined value profile within the time interval for each time. The value profile thus provides a maximum allowed profile, which cannot be exceeded, but failing to reach it is allowed.

The method can be performed without iterations. The method is fast, quite computationally efficient and accurate, and is therefore suitable for the simultaneous consideration of a plurality of components to be protected, e.g., in the drive train on the micro-controller of an inverter, without a significant computational load or memory demand increase. The effort for model creation and calibration is low.

The at least one controlled variable (or adjustment variable) can, e.g., be a current intensity or voltage. Further, the controlled variable can also be a torque, e.g., in the case that the controlled variable originates from the driving strategy of the supervisory VCU used to drive the electrical system.

According to one embodiment of the method, the output variable being protected is a temperature, a pressure, or the like in the electrical system.

According to a further embodiment of the method, the curve of the allowed values of the controlled variable is determined by interpolation of the first allowed value of the controlled variable for the first predetermined value of the output variable, and on the basis of the at least one second allowed value of the controlled variable for the at least one second predetermined value of the output variable.

According to a further embodiment of the method, the dependence of the output variable on the controlled variable is described by a linear or linearizable model. The method is in particular applicable to all electrical systems having status variables or having output parameters able to be described using a linear or linearizable model and for which a derating method in the form of a curve (derating curve) is predetermined. The curve can describe a relationship between the load or excitation variable and the output variable to be protected. The linear or linearizable model can be a description of a linear time invariant (LTI) or a linear parameter variant (LPV).

According to a further embodiment of the method, the value profile is jumpy in nature, whereby, for a predetermined value of the output variable, the allowed value $u_{allowed}$ of the controlled variable is calculated by the following formula:

$$u_{allowed} = \frac{\Delta y}{\phi(t_1)}$$

where $\Delta y$ is the determined difference and $\phi(t_1)$ is the value of a jump response associated with the linear or linearizable model at the end time $t_1$.

According to another embodiment of the method, the controlled variable is less than a limit value predetermined on the basis of system limitations of the electrical system. The value profile of the controlled variable within the time interval is determined as the value profile for which the end value of the value profile assumes the predetermined limit value if the first allowed value of the controlled variable and the at least one second allowed value of the controlled variable is greater than the predetermined limit value.

According to a further embodiment of the method, the electrical system is an electrical drive, whereby the at least one output variable comprises a temperature of at least one component of the electrical system.

According to a further embodiment of the method, a phase current or torque of the electrical drive is activated dependent on the determined value profile of the controlled variable.

According to a further embodiment of the apparatus, the computing device is designed to determine the curve of the allowed values of the controlled variable by interpolating the first allowed value of the controlled variable for the first predetermined value of the output variable and the at least one allowed value of the controlled variable for the at least one predetermined value of the output variable.

BRIEF DESCRIPTION OF THE DRAWINGS

Shown are.

In all figures, identical or functionally identical elements and devices are provided with the same reference numerals. The numbering of the method steps is used for reasons of clarity and is generally not intended to imply any particular temporal order. It is in particular also possible to perform multiple method steps simultaneously.

DETAILED DESCRIPTION

Figure 1:
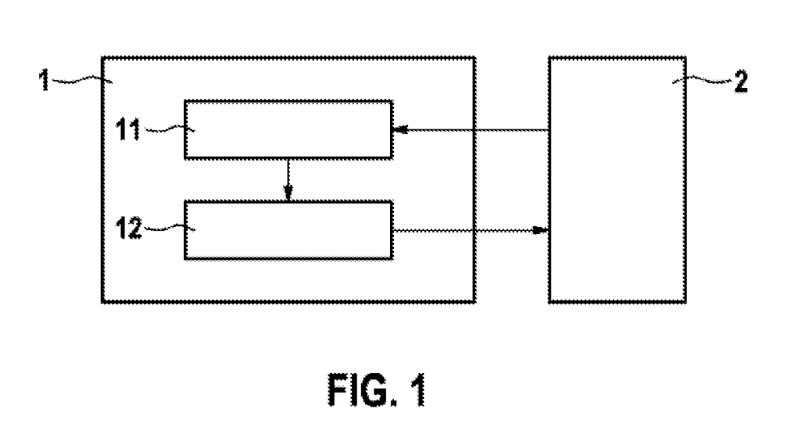
FIG. 1 a schematic block diagram of an apparatus for determining a value profile of a controlled variable of an electrical system according to one embodiment of the invention.

FIG. 1 shows a schematic block diagram of an apparatus 1 for determining a value profile of a controlled variable of an electrical system 2 at a predetermined time interval.

The electrical system 2 can be, for example, an electrical drive. The electrical system 2 is operated using a derating method. The electrical system 2 is controllable with a controlled variable, whereby an output variable is set in the electrical system 2 on the basis of a system behavior of the electrical system 2 dependent on the controlled variable.

The apparatus 1 comprises a computing device 11 which is coupled to the electrical system 2 and receives instantaneous values of at least one output variable from the same. The at least one output variable depends on an operating state of at least one component of the electrical system 2 and comprises, e.g., a temperature of components of the electrical system 2. The components of the electrical system can be, for example, temperature-sensitive semiconductor elements such as IGBTs. The computing device 11 can comprise one or more microprocessors as well as memories.

The computing device 11 determines a value profile of a controlled variable for the predetermined time interval, for example 1 second, 5 seconds, or 10 seconds. The controlled variable can be a phase current for an electrical drive, a voltage, a torque derived therefrom, or the like. A starting time $t_0$ of the time interval can correspond to an instantaneous time or a future-prone time.

The computing device 11 calculates the dependence of the output variable on the controlled variable on the basis of a linear or linearizable model.

The computing device 11 determines a value of the output variable at an end time $t_1$ of the predetermined time interval can be determined dependent on an actual value of the output variable at the starting time $t_0$ of the time interval, dependent on the controlled variable assuming the value zero within the time interval.

The computing device 11 further determines a first difference between a first predetermined value of the output variable at the end time $t_1$ and the determined value of the output variable at the end time $t_1$. The computing device 11 further determines at least one second difference between at least one of a second predetermined value of the output variable at the end time $t_1$ and the determined value of the output variable at the end time $t_1$. The computing device 11 determines a value profile of the controlled variable in the time interval, the value profile being dependent on an end value at the end time $t_1$ and being determined uniquely by the specification of the end value. The computing device 11 determines a first allowed value of the controlled variable such that, when the electrical system 2 is activated, the value of the output variable at the end time $t_1$ is equal to the determined first difference, dependent on the controlled variable assuming the predetermined value profile within the time interval, the end value being equal to the first allowed value. The computing device 11 determines at least one second allowed value of the controlled variable such that, when the electrical system 2 is activated, the value of the output variable at the end time $t_1$ is equal to the determined second difference, dependent on the controlled variable assuming the predetermined value profile within the time interval, the end value being equal to the second allowed value. The computing device 11 determines a curve of the allowed values of the controlled variable on the basis of the output variable, on the basis of the first allowed value of the controlled variable for the first predetermined value of the output variable, and on the basis of the at least one second allowed value of the controlled variable for the at least one second predetermined value of the output variable. The computing device 11 determines a point of intersection of the determined curve and a predetermined derating function. The derating function describes a maximum permitted controlled variable in a derating method dependent on the output variable. The computing means 11 determines the value profile of the controlled variable within the time interval as the value profile for which the end value of the value profile assumes the value of the controlled variable at the point of intersection.

The determined temporal value profile of the controlled variable is output via a wireless or wired interface 12 to a control unit of the electrical machine 2, which control unit controls the electrical machine 2 and components of the electrical machine 2 taking into account the determined value profile of the controlled variable.

Figure 2:
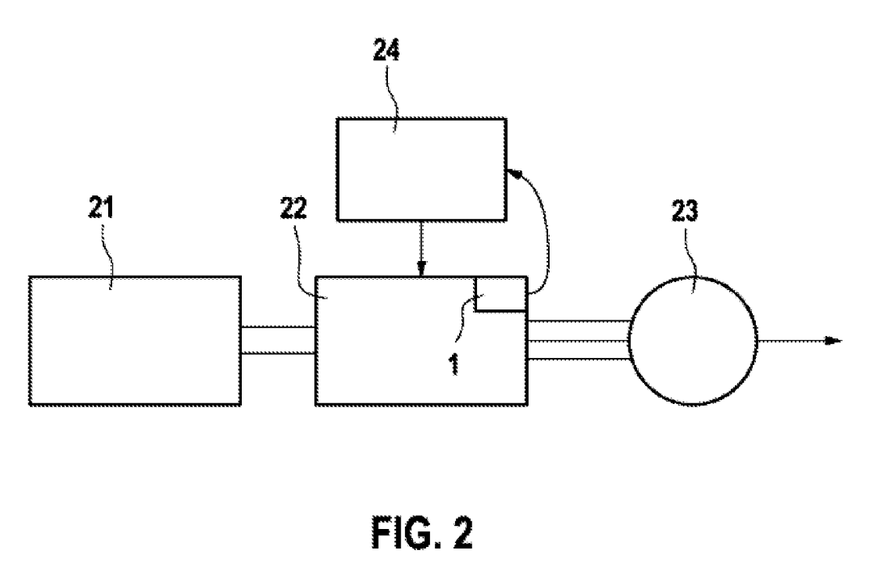
FIG. 2 a schematic block diagram of an electrical drive with an apparatus for determining a value profile of a controlled variable of the electrical system according to one embodiment of the invention.

FIG. 2 shows a schematic block diagram of an electrical drive 2 as an electrical system 2 comprising an apparatus 1 as described hereinabove. The electrical drive 2 comprises a DC battery 21, which is coupled to an inverter 22, which in turn supplies power to an electrical machine 23 that provides a torque Tq. The apparatus 1 is integrated into the inverter 22, which outputs the temporal value profile of the controlled variable to a control means (VCU) 24. The control means 24 controls the inverter 22 of the electrical machine 2 taking into account the temporal value profile of the controlled variable. The determined value profile of the controlled variable can be directly used for activation. Alternatively, the determined value profile of the controlled variable can define a maximum curve, which may not be exceeded.

Figure 3:
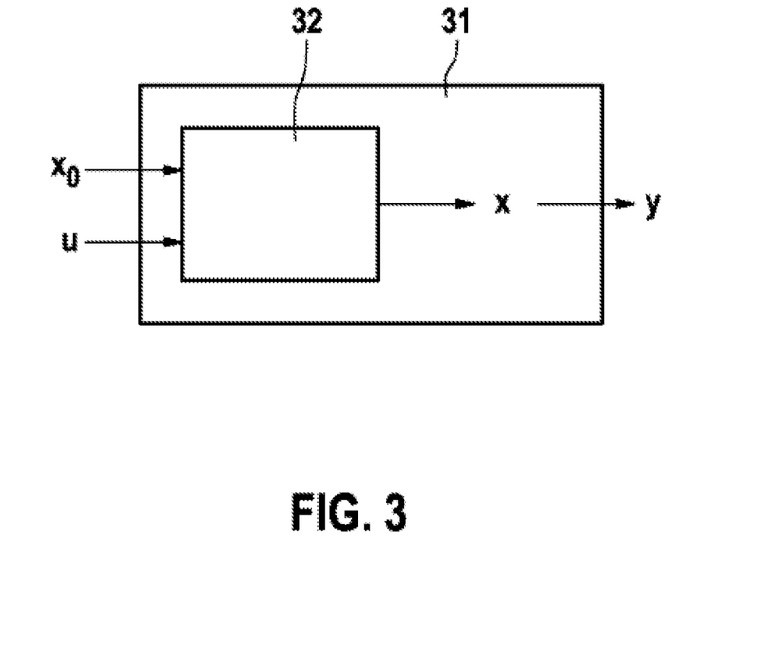
FIG. 3 a linear or linearizable model describing a behavior of components of the electrical machine.

FIG. 3 shows a linear or linearizable model 31 describing a behavior of components of the electrical machine 2. For example, the linear model 31 can describe an LTI or LPV system and can serve to calculate the temporal behavior of the relevant output variable y(t) dependent on time, such as a temperature T. The calculation is based on a previous system state xo as well as a controlled variable u. The controlled variable u can also be referred to as an input variable, an excitation, or a load. The linear or linearizable model 31 calculates an instantaneous system state x under various loading conditions u(t), taking into account system dynamics 32, and predicts the value of the output variable y therefrom.

Figure 4:
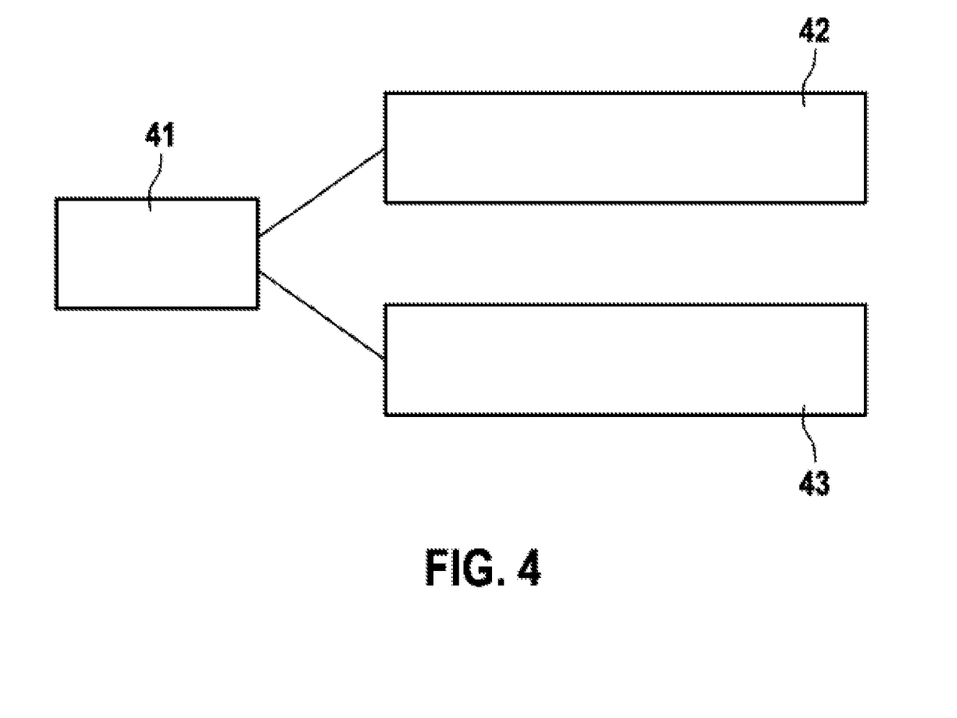
FIG. 4 a schematic block diagram illustrating the linear model.

FIG. 4 shows a schematic block diagram illustrating a linear model 41, such as the linear model 31 described above. For this purpose, the linear model 41 is broken down into two parts, i.e., a first model 42 and a second model 43.

The first model 42 serves to calculate the behavior of the output variable for the unloaded (homogeneous) case with starting conditions, i.e., a transient decay behavior on the basis of the load history, i.e., assuming that the electrical system 2 is not loaded with respect to the at least one controlled variable in the time interval. Based on the first model 42, the value of the output variable at the end time $t_1$ of the predetermined time interval can be determined dependent on an actual value of the output variable at the starting time $t_0$ of the time interval, dependent on the controlled variable assuming the value zero within the time interval.

The second model 43 is used to calculate a jump response ϕ(t), i.e., the behavior of the output variable under load at an adjustable load within the time interval and without preloading (starting condition=0). The second model 43 therefore calculates a loading behavior of the at least one output variable y without preloading of the electrical system 2 and under the assumption that there is an adjustable load of the electrical system 2 in the time interval, in particular a unit load jump H(t).

Figure 5:
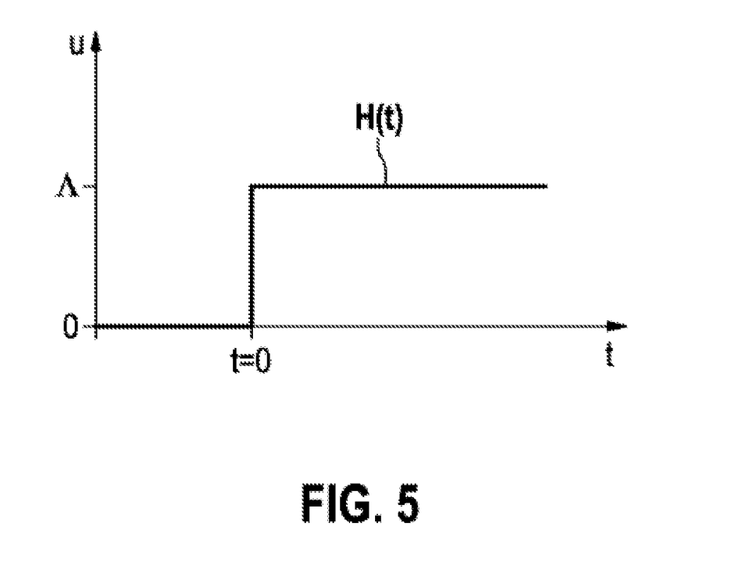
FIG. 5 a view of a scalable load jump.

FIG. 5 shows a view of an exemplary scalable load jump H(t) dependent on time t. The controlled variable (load) u jumps from a value 0 at the starting time t=0 of the predetermined time interval to a constant value Λ, and is thus described by a Heaviside function with a scalable prefactor Λ.

Figure 6:
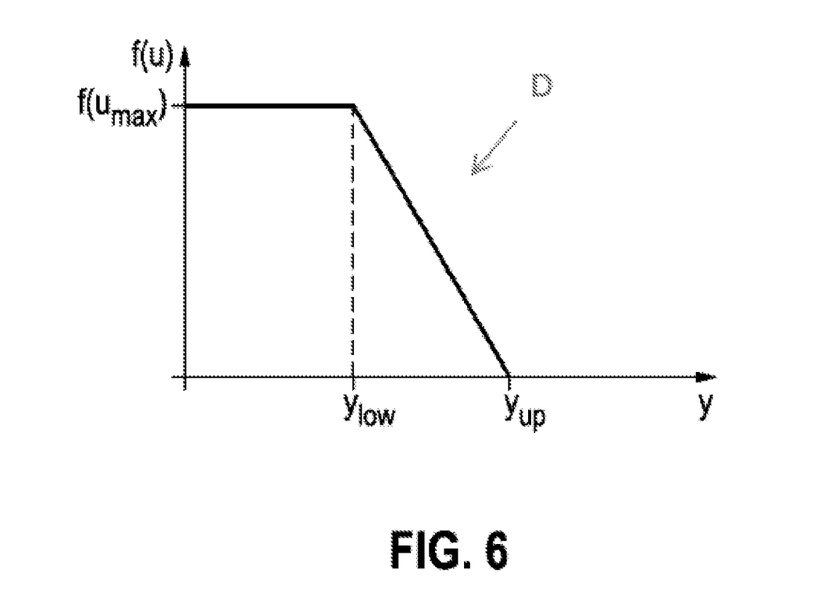
FIG. 6 a schematic illustration of a derating curve.

FIG. 6 shows a schematic illustration of a derating curve D in order to describe the derating method, i.e., a curtailing relationship between the output variable y (state) being limited (protected) and the controlled variable u (load variable, e.g., power dissipation or phase current) to be optionally reduced. In this case, a function ƒ(u) dependent on the controlled variable u is applied, where in the simplest case ƒ(u) u applies.

As soon as the output variable y to be protected (e.g., the temperature of a component of the electrical system 2) reaches a lower limit value $y_{low}$, the value of the function ƒ(u) decreases from the maximum value ƒ($u_{max}$) until it assumes the value 0 for an upper limit value $y_{up}$ of the output variable y. In the simplest case, the behavior in this region is linear. Between the limit values $y_{low}$ and $y_{up}$, there is thus a derating (curtailing), meaning that the load is reduced.

Figure 7:
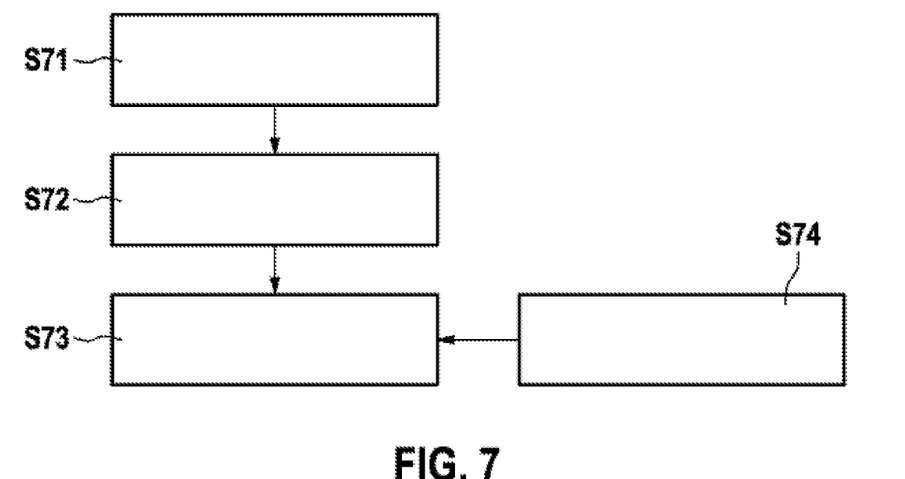
FIG. 7 a flowchart of a method for determining a value profile of a controlled variable of an electrical system according to one embodiment of the invention.

FIG. 7 shows a flowchart of a method for determining a value profile of a controlled variable of an electrical system 2, which is operated as described hereinabove using a predetermined derating method.

In a first method step S71, dependent on an actual value of the starting time interval y at a starting time of the time interval (i.e., an instantaneous system state xo) and dependent on the controlled variable assuming the value zero within the time interval, a value of the output variable y is determined at the end time θ of the predetermined time interval. A reserve available without a load is thus calculated with respect to the at least one output variable y, which is, e.g., a temperature reserve $y_{resv}$.

In a second method step S72, an allowed value $u_{allowed}$ of the controlled variable u is calculated, i.e. a maximum amplitude $u_{allowed}$ for a step function as an input signal, with which a limit $y_{limit}$ of the output variable y is barely reached during the period of time.

If the determined permitted controlled variable $u_{allowed}$ for the value of the output variable $y_{limit}$ at which the derating starts is greater than the upper limit $u_{max}$ ($u_{allowed} > u_{max}$) possible on the basis of other system limitations, then $u_{pred} = u_{max}$ can be used for the prediction.

Otherwise, steps S71 and S72 are repeated in order to determine a working characteristic curve that describes the relationship of the output variable achieved in the time period $y_{limit,n}$ and the associated load $u_{allowed,n}$. In this case, n=2 can apply, i.e., the calculation is for two boundary values for v. Alternatively, the calculation can be performed for a plurality of values, i.e., n>2, whereby a polynomial interpolation or spline interpolation can for example be used. For example, the working characteristic curve can be described in a linearized or square manner. The working characteristic curve is a curve of the allowed values of the controlled variable.

Specially occurring cases are intercepted appropriately if, for example, $u_{allowed} > u_{max}$ or the size $y_{resv} < 0$.

Given the assumption/precondition of a linear or linearizable dynamic system behavior, it is possible to precisely determine the input excitation for which a relevant output variable is precisely achieved in a reverse analytical calculation, rather than inferring the associated output variable at a freely selectable level of input excitation (loss power) in a forward modeling process.

The dynamic system behavior can be described by a differential equation (DGL), whereby the output variable y(t) is the solution of the DGL to a known controlled variable u(t). The DGL has the following general formula:

$$a_n y^n + \ldots a_2 \ddot{y} + a_1 \dot{y} + a_0 y = b_m u^m + \ldots + b \ddot{u} + b_1 \dot{u} + b_0 u.$$

The solution y(t) is composed of a homogeneous solution $y_H(t)$ and a particular solution $y_P(t)$:

$$y(t) = y_H(t) + y_P(t)$$

The starting point is a target value for $y(\Delta t_{pred}) = y_{limit}$ after a predetermined (prediction) period of $\Delta t_{pred}$.

In method step S74, the boundary condition is used that the load corresponds to a scaled step function $u(t) = u \cdot H(t)$ during the period of time, where H denotes a Heaviside function with a jump at to.

The particular solution can then be described using the ϕ(t) jump response:

$$y_P(t) = u\phi(t).$$

The homogeneous solution can be described analytically for a known prediction period by suitable discretization, such that a decay value in the prediction period $y_H(\Delta t_{pred})$ is calculable with known starting conditions (in the form of temporal derivations from the past, or states in a state-space description). In this context, the above equation can be rewritten as:

$$y_{limit} = y_H(\Delta t_{pred}) + u \cdot \phi(\Delta t_{pred}).$$

In method step S73, this equation can be resolved according to the unknown height of the load jump u:

$$\frac{y_{limit} - y_H(\Delta t_{pred})}{\phi(\Delta t_{pred})} = u = u_{allowed}$$

The method is directly applicable if the input variable can be described as a single variable system, i.e., approximately the power loss that is relevant for the output temperature. An extension to a multi-variable system with a linear equation system is possible.

A point of intersection of the curve or working characteristic curve and derating function D supplies the predicted possible load $u_{allowed}$. The value $u_{pred}$ is translated into a variable that is usable for the driving strategy, for example a torque $tq_{pred}$, as an input variable for the control means 24.

Figure 8:
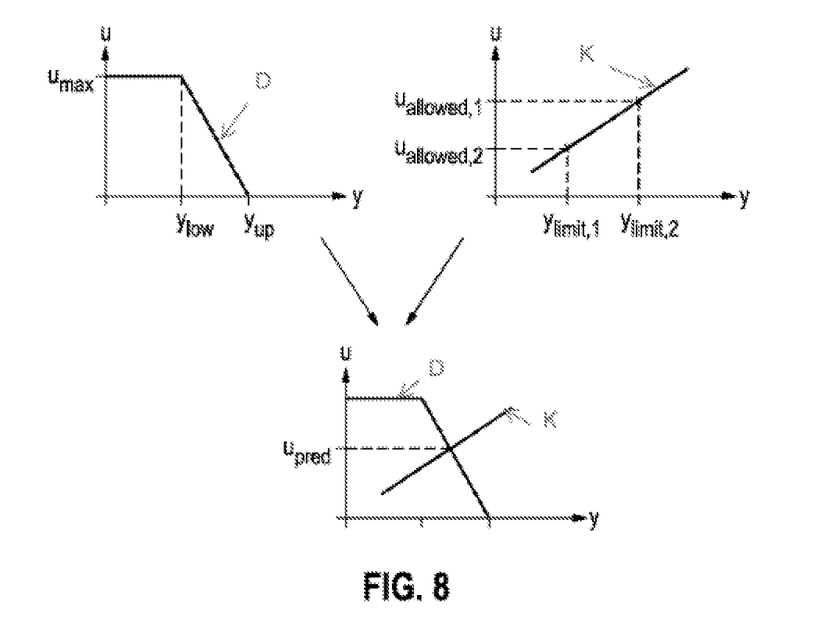
FIG. 8 an explanation of the determination of the controlled variable by calculating a point of intersection of a derating curve and a determined curve.

FIG. 8 shows an explanation of the determination of the controlled variable by calculating a point of intersection of a derating function D and the determined curve K. The derating function D shown at upper left has the profile shown in FIG. 6. The curve K illustrated in the upper right corner is linear, whereby allowed values $u_{allowed,1}$ and $u_{allowed,2}$ correspond to the controlled variable u and respective limit values $y_{limit,1}$ and $y_{limit,2}$ correspond to the output variable y. A point of intersection of the two curves D, K gives the value $u_{pred}$ of the controlled variable u. An associated value profile in the time interval corresponds to a jump at the starting time $t_0$ to the determined value $u_{pred}$ of the controlled variable u, which is assumed during the entire time interval.

Figure 9:
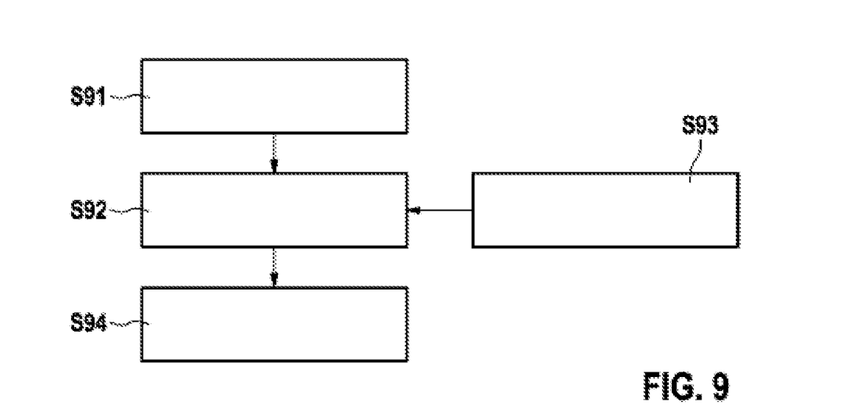
FIG. 9 a further flowchart of a method for determining a value profile of a controlled variable of an electrical system according to one embodiment of the invention.

FIG. 9 shows a further flowchart of a method for determining a value profile of a controlled variable of an electrical system 2 according to an embodiment of the invention. A derating function D is provided for this purpose in a first method step S91. In a second method step S93, a working characteristic curve K is calculated. In a third method step S92, the value $u_{pred}$ is calculated on the basis of the working characteristic curve K and the derating characteristic curve D, as described in greater detail above. In a fourth method step S94, a transformation into an output variable for the driving strategy is performed, e.g. a torque $tq_{pred}$.

Figure 10:
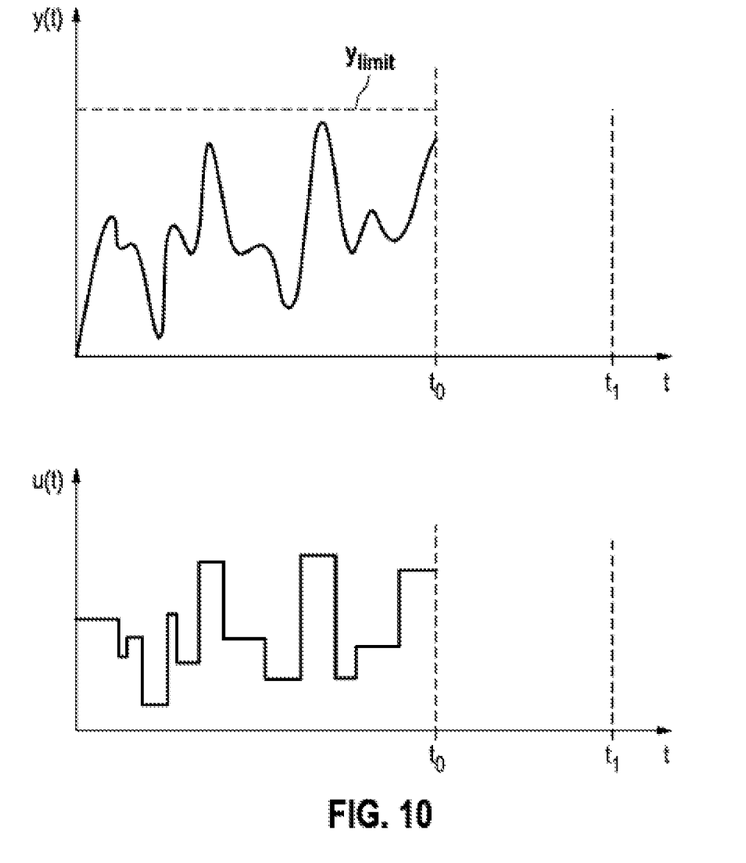
FIG. 10 an exemplary profile of a controlled variable and an output variable up to the starting time of the time interval.

FIG. 10 shows an exemplary profile of an output variable y (top of FIG. 10) and a control variable u (bottom of FIG. 10) until the starting time $t_0$ of the prediction, i.e., until the starting time $t_0$ of the time interval. The end time $t_1$ of the time interval is also illustrated. A limit value $y_{limit}$ is specified for the output variable.

Figure 11:
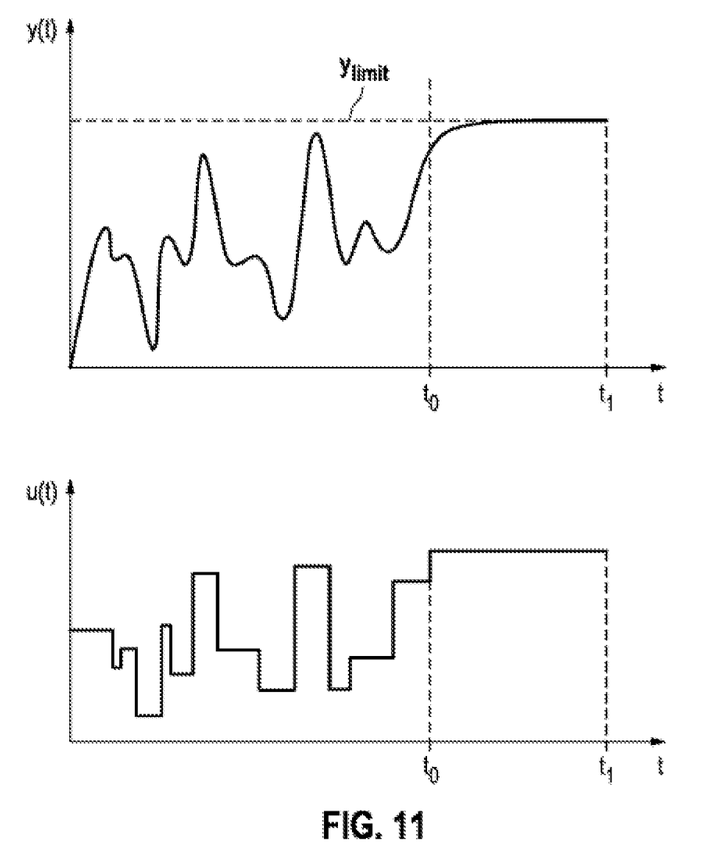
FIG. 11 an exemplary profile of a controlled variable and an output variable with a predicted profile at the predetermined time interval.

FIG. 11 shows an exemplary profile of an output variable y (top of FIG. 11) and a controlled variable u (bottom of FIG. 11) with a value profile of the controlled variable u determined using the method according to the invention at the predetermined time interval.

Figure 12:
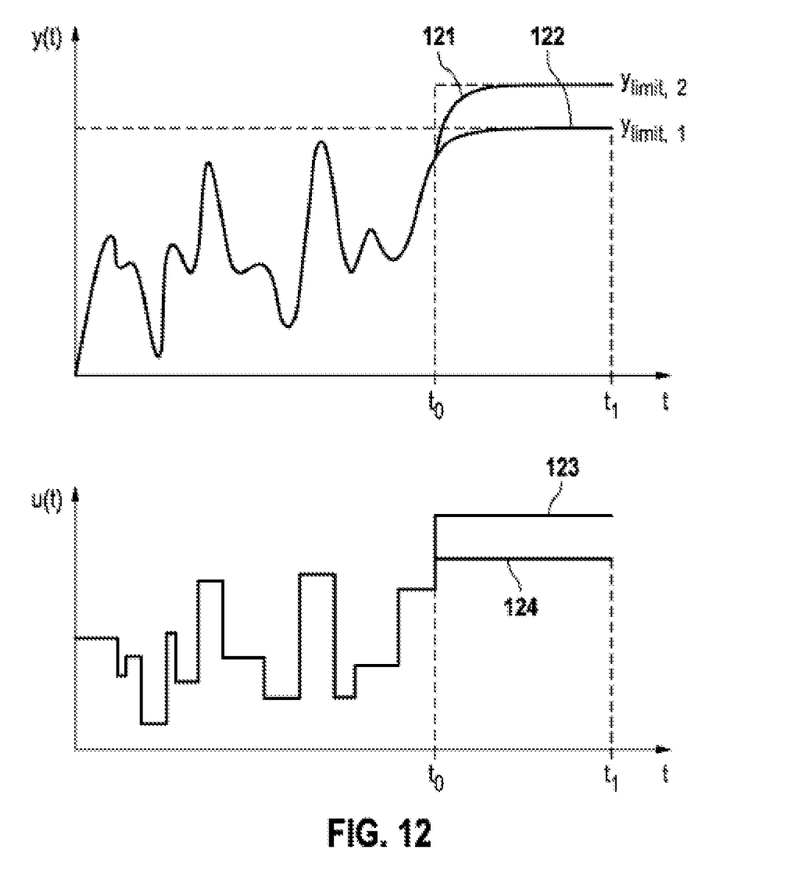
FIG. 12 an exemplary profile of a controlled variable and an output variable with a predicted profile at the predetermined time interval for different limit values.

FIG. 12 shows exemplary profiles 121, 122 of an output variable y (top of FIG. 12) and profiles 123, 124 of a controlled variable u (bottom of FIG. 12) with a value profile of the controlled variable u determined using the method according to the invention u at the predetermined time interval for different limit values $y_{limit,1}$ and $y_{limit,2}$.

Figure 13:
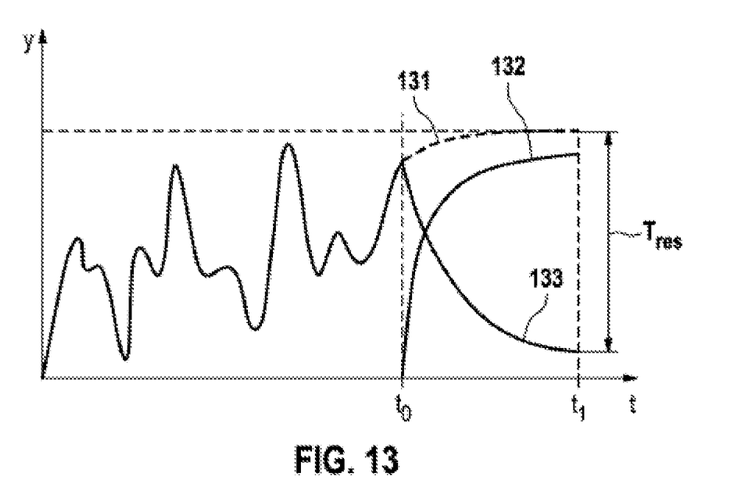
FIG. 13 an exemplary profile of an output variable dependent on time.

FIG. 13 shows an exemplary profile of an output variable y dependent on time t. The contributions are shown on the basis of the decay behavior 133 and on the basis of a load behavior 132. The two contributions provide the overall behavior 131. The temperature reserve $T_{res}$ is optimally utilized.

Figure 14:
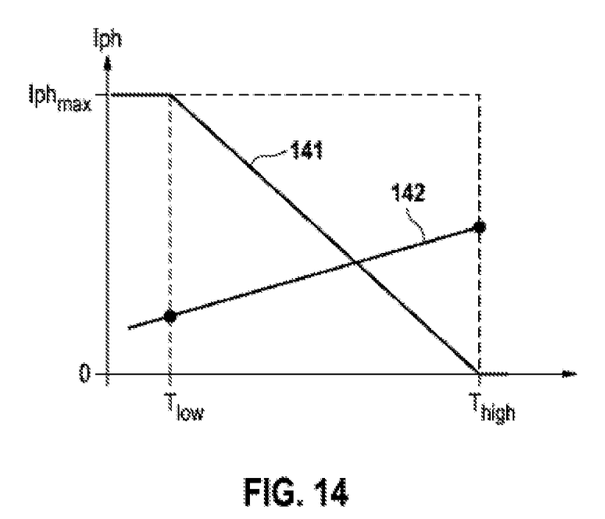
FIG. 14 an explanation of the determination of the controlled variable by calculating a point of intersection of a derating function and a determined curve in case of a phase current.

FIG. 14 shows an explanation of the determination of the controlled variable by calculating a point of intersection of a derating function 141 and a determined curve 142 in case of a phase current Iph. Also illustrated are the maximum phase current $Iph_{max}$ and the lower and upper limit values of temperature, $t_{low}$ and $t_{high}$.

Figure 15:
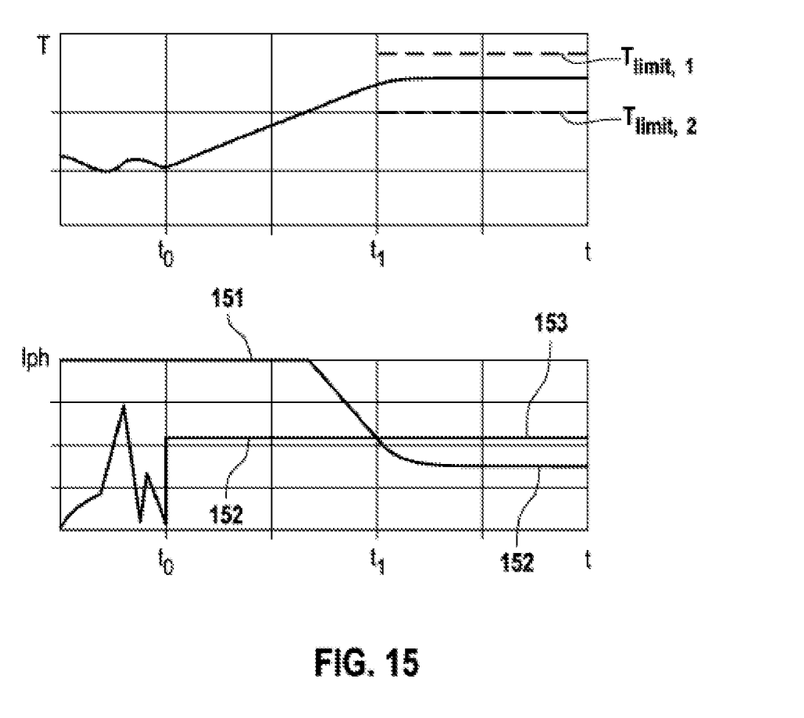
FIG. 15 an exemplary profile of a temperature and a phase current dependent on time.

FIG. 15 shows an exemplary profile of a temperature T (top of FIG. 15) with limit values $T_{limit,1}$ and $T_{limit,2}$ corresponding to the limit values $T_{low}$ and $T_{high}$ for the derating function 141 in FIG. 14.

The predicted or desired phase current 153 and the maximum allowed phase current 151 are illustrated at the bottom of FIG. 15. The actual behavior 152 of the phase current results when the determined value profile is set from the starting time $t_0$ and the derating engages from the time $t_1$ and the actual phase current is below the determined phase current. The temperature profile in FIG. 15 corresponds to the current profile 152.

The invention claimed is:

1. A method for determining a value profile of a controlled variable (u) of an electrical system (2) at a predetermined time interval, wherein the electrical system (2) is activated using the controlled variable (u), and wherein, on the basis of a system behavior of the electrical system (2) dependent on the controlled variable (u), an output variable (y) is set in the electrical system (2), said method comprising the following steps:

determining, via a computer, a value of the output variable (y) at an end time ($t_1$) of the predetermined time interval, dependent on an actual value of the output variable (y) at a starting time ($t_0$) of the time interval, and dependent on the controlled variable (u) assuming the value zero within the time interval;

determining, via the computer, a first difference between a first predetermined value ($y_{limit,1}$) of the output variable (y) at the end time ($t_1$) and the determined value of the output variable (y) at the end time ($t_1$);

determining, via the computer, at least one second difference between at least one of a second predetermined value ($y_{limit,2}$) of the output variable (y) at the end time ($t_1$) and the determined value of the output variable (y) at the end time ($t_1$);

determining, via the computer, a value profile of the controlled variable (u) in the time interval, wherein the value profile depends on an end value at the end time ($t_1$) and is determined uniquely by the specification of the end value;

determining, via the computer, a first allowed value ($u_{allowed,1}$) of the controlled variable (u) such that, when the electrical system (2) is activated, the value of the output variable (y) at the end time ($t_1$) is equal to the determined first difference, dependent on the controlled variable (u) assuming the predetermined value profile within the time interval, wherein the end value is equal to the first allowed value ($u_{allowed,1}$)

determining, via the computer, at least one second allowed value ($u_{allowed,2}$) of the controlled variable (u) such that, when the electrical system (2) is activated, the value of the output variable (y) at the end time ($t_1$) is equal to the determined second difference, dependent on the controlled variable (u) assuming the predetermined value profile within the time interval, wherein the end value is equal to the second allowed value ($u_{allowed,2}$)

determining, via the computer, a curve (K) of the allowed values of the controlled variable (u) on the basis of the output variable (y), on the basis of the first allowed value ($u_{allowed,1}$) of the controlled variable (u) for the first predetermined value ($y_{limit,1}$) of the output variable (y), and on the basis of the at least one second allowed value ($u_{allowed,2}$) of the controlled variable (u) for the at least one second predetermined value ($y_{limit,2}$) of the output variable (y);

determining, via the computer, a point of intersection of the determined curve (K) and a predetermined derating function (D), wherein the derating function (D) describes a maximum allowed controlled variable ($u_{max}$) in a derating method dependent on the output variable (y); and determining, via the computer, the value profile of the controlled variable (u) within the time interval as the value profile for which the end value of the value profile assumes the value ($u_{pred}$) of the controlled variable (u) at the point of intersection.

2. The method according to claim 1, wherein the curve of the allowed values of the controlled variable (u) is determined by interpolation of the first allowed value ($u_{allowed,1}$) of the controlled variable (u) for the first predetermined value ($y_{limit,1}$) of the output variable (y) and the at least one second allowed value ($u_{allowed,2}$) of the controlled variable (u) for the at least one second predetermined value ($y_{limit,2}$) of the output variable (y).

3. The method according to claim 1, wherein the dependence of the output variable (y) on the controlled variable (u) is described by means of a linear or linearizable model.

4. The method according to claim 3, wherein the value profile is jumpy in nature, and wherein, for a predetermined value of the output variable (y), the allowed value $u_{allowed}$ of the controlled variable (u) is calculated by the following formula:

$$u_{allowed} = \frac{\Delta y}{\phi(t_1)}$$

wherein $\Delta y$ is the determined difference and $\phi(t_1)$ is the value of a jump response associated with the linear or linearizable model at the end time $t_1$.

5. The method according to claim 1, wherein the controlled variable (u) is less than a limit value predetermined on the basis of system limitations of the electrical system (2), and wherein the value profile of the controlled variable (u) is determined within the time interval as the value profile for which the end value of the value profile assumes the predetermined limit value if the first allowed value ($u_{allowed,1}$) of the controlled variable (u) and at least one of the second allowed values ($u_{allowed,2}$) of the controlled variable (u) is greater than the predetermined limit value.

6. The method according to claim 1, wherein the electrical system (2) is an electrical drive and wherein the at least one output variable (y) comprises a temperature of at least one component of the electrical system (2).

7. The method according to claim 6, wherein a phase current or torque of the electrical drive is activated dependent on the determined value profile of the controlled variable (u).

8. An apparatus (1)) for determining a value profile of a controlled variable (u) of an electrical system (2) at a predetermined time interval, wherein the electrical system (2) can be activated using the controlled variable (u), and wherein, on the basis of a system behavior of the electrical system (2) dependent on the controlled variable (u), an output variable (y) is set in the electrical system (2), said apparatus comprising:

a computing device (11) which is configured to:

determine a value of the output variable (y) at an end time ($t_1$) of the predetermined time interval, dependent on an actual value of the output variable (y) at a starting time ($t_0$) of the time interval, and dependent on the controlled variable (u) assuming the value zero within the time interval;

determine a first difference between a first predetermined value ($y_{limit,1}$) of the output variable (y) at the end time ($t_1$) and the determined value of the output variable (y) at the end time ($t_1$);

determine at least one second difference between at least one of a second predetermined value ($y_{limit,2}$) of the output variable (y) at the end time ($t_1$) and the determined value of the output variable (y) at the end time ($t_1$);

determine a value profile of the controlled variable (u) in the time interval, wherein the value profile depends on an end value at the end time ($t_1$) and is determined uniquely by the specification of the end value;

determine a first allowed value ($u_{allowed,1}$) of the controlled variable (u) such that, when the electrical system (2) is activated, the value of the output variable (y) at the end time ($t_1$) is equal to the determined first difference, dependent on the controlled variable (u) assuming the predetermined value profile within the time interval, wherein the end value is equal to the first allowed value ($u_{allowed,1}$)

determine at least one second allowed value ($u_{allowed,2}$) of the controlled variable (u) such that, when the electrical system (2) is activated, the value of the output variable (y) at the end time ($t_1$) is equal to the determined second difference, dependent on the controlled variable (u) assuming the predetermined value profile within the time interval, wherein the end value is equal to the second allowed value ($u_{allowed,2}$)

determine a curve (K) of the allowed values of the controlled variable (u) on the basis of the output variable (y), on the basis of the first allowed value ($u_{allowed,1}$) of the controlled variable (u) for the first predetermined value ($y_{limit,1}$) of the output variable (y), and on the basis of the at least one second allowed value ($u_{allowed,2}$) of the controlled variable (u) for the at least one second predetermined value ($y_{limit,2}$) of the output variable (y);

determine a point of intersection of the determined curve (K) and a predetermined derating function (D), wherein the derating function (D) describes a maximum allowed controlled variable ($u_{max}$) in a derating method dependent on the output variable (y); and determine the value profile of the controlled variable (u) within the time interval as the value profile for which the end value of the value profile assumes the value ($u_{pred}$) of the controlled variable (u) at the point of intersection; and an interface (12) designed to output the determined value profile of the controlled variable (u) in order to control the electrical system (2).

9. The apparatus (1)) according to claim 8, wherein the computing device (11) is configured to determine the curve of the allowed values of the controlled variable (u) by interpolating the first allowed value ($u_{allowed,1}$) of the controlled variable (u) for the first predetermined value ($y_{limit,1}$) of the output variable (y) and the at least one second allowed value ($u_{allowed,2}$) of the controlled variable (u) for the at least one second predetermined value ($y_{limit,2}$) of the output variable (y).

10. An electrical system (2) comprising:

an apparatus (1)) for determining a value profile of a controlled variable (u) of the electrical system (2) according to claim 8; and a control means (24) designed to control the electrical system (2) within the time interval dependent on the determined value profile of the controlled variable (u).

\* \* \* \* \*